(12) United States Patent  
Plummer et al.

(10) Patent No.: US 7,426,020 B2  
(45) Date of Patent: Sep. 16, 2008

(54) SYSTEM FOR PRINT IMAGING WITH PRISM ILLUMINATION OPTICS

(75) Inventors: William T. Plummer, Concord, MA (US); George W. McClurg, Jensen Beach, FL (US); John F. Carver, Palm City, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 259 days.

(21) Appl. No.: 11/193,324

(22) Filed: Aug. 1, 2005

(65) Prior Publication Data

US 2005/0264878 A1    Dec. 1, 2005

Related U.S. Application Data

(63) Continuation-in-part of application No. 10/462,592, filed on Jun. 17, 2003, now Pat. No. 6,954,261.

(60) Provisional application No. 60/598,124, filed on Aug. 3, 2004.

(51) Int. Cl.  
*G06K 9/74* (2006.01)

(52) U.S. Cl. .......................... 356/71; 356/446

(58) Field of Classification Search .......... 356/71, 356/446; 382/115, 124–125, 127; 359/566; 362/558  
See application file for complete search history.

(56) References Cited

U.S. PATENT DOCUMENTS

| | | | |
|---|---|---|---|
| 3,672,281 A * | 6/1972 | Land | 396/352 |
| 3,704,617 A | 12/1972 | Plummer | |
| 3,718,078 A | 2/1973 | Plummer | |
| 4,722,023 A * | 1/1988 | Arima et al. | 362/503 |
| 5,548,394 A * | 8/1996 | Giles et al. | 356/71 |
| 5,623,553 A | 4/1997 | Sekiya | |
| 5,629,764 A | 5/1997 | Bahuguna et al. | |
| RE35,534 E | 6/1997 | Claytor | |
| 5,963,657 A | 10/1999 | Bowker et al. | |
| 5,986,746 A | 11/1999 | Metz et al. | |
| 6,127,674 A | 10/2000 | Shinzaki et al. | |

(Continued)

FOREIGN PATENT DOCUMENTS

EP    0 847 024 A2    6/1998

(Continued)

OTHER PUBLICATIONS

O.E. Miller, et al.; "Thin Sheet Plastic Fresnel Lenses of High Aperture," pp. 807-815, Journal of the Optical Society of America, vol. 41, No. 11, Nov. 1951.

(Continued)

*Primary Examiner*—Gregory J. Toatley, Jr.  
*Assistant Examiner*—Tri T Ton  
(74) *Attorney, Agent, or Firm*—Sterne, Kessler, Goldstein & Fox, P.L.L.C.

(57) ABSTRACT

A directionally-oriented reflective device is optically coupled to a prism surface in a skin ridge pattern imaging system to reflect illumination light at relatively small angles, along an optical path to an imaging device, so that minimal light is lost from the optical system. Examples of such directionally-oriented reflective devices include, but are not limited to, echelon reflectors, faceted reflective surfaces, retroreflectors, aluminum paint, nacreous pigment, and slightly rough mirror surfaces.

27 Claims, 8 Drawing Sheets

U.S. PATENT DOCUMENTS

| | | | |
|---|---|---|---|
| 6,154,285 | A | 11/2000 | Teng et al. |
| 6,324,020 | B1 | 11/2001 | Teng et al. |
| 6,381,347 | B1 | 4/2002 | Teng et al. |
| 6,891,673 | B2 * | 5/2005 | Cado et al. ................ 359/487 |
| 6,954,261 | B2 | 10/2005 | McClurg |
| 7,119,890 | B2 | 10/2006 | McClurg |
| 2002/0110266 | A1 | 8/2002 | Teng et al. |
| 2003/0133103 | A1 * | 7/2003 | Arnold et al. ............ 356/237.2 |
| 2004/0041998 | A1 * | 3/2004 | Haddad ...................... 356/71 |
| 2004/0257627 | A1 * | 12/2004 | McClurg ................... 358/509 |

FOREIGN PATENT DOCUMENTS

| | | |
|---|---|---|
| WO | WO 96/13742 A1 | 5/1996 |
| WO | WO 01/11549 A1 | 2/2001 |
| WO | WO 2004/114078 A3 | 6/2004 |

OTHER PUBLICATIONS

International Preliminary Report on Patentability including Written Opinion for PCT/US2004/019239; 5 pages.

International Search Report for International Application No. PCT/US2004/019239; 7 pages.

Appendix F IAFIS Image Quality Specifications; Federal Bureau of Investigation--CJIS Electronic Fingerprint Transmission Specification; 17 pages.

Supplementary European Search Report for European Application No. EP 04 75 5416 completed on Dec. 12, 2007, 1 pg.

Examination for European Application No. 04 755 416.7 mailed on Apr. 7, 2008, 3 pgs.

* cited by examiner

SYSTEM FOR PRINT IMAGING WITH PRISM ILLUMINATION OPTICS

This application claims the benefit of U.S. Provisional Application No. 60/598,124 filed Aug. 3, 2004, incorporated by reference herein in its entirety, and is a continuation-in-part of U.S. application Ser. No. 10/462,592 filed Jun. 17, 2003, now U.S. Pat. No. 6,954,261 B2 that issued on Oct. 11, 2005, also incorporated by reference herein in its entirety.

BACKGROUND OF THE INVENTION

1. Field of the Invention

The present invention relates generally to the field of skin ridge pattern imaging, and has particular applications in imaging of skin pressed against a platen surface, such as in fingerprint imaging.

2. Background Art

Internal reflection from a prism surface is typically used to see and photograph the unique pattern of ridges on a fingerprint, handprint, or other skin surface. Known imaging methods include dark-field viewing and bright-field viewing. In dark-field viewing, the image is seen by light scattered from finger ridges contacting a platen surface, and unimpeded total reflection gives a view of a black background surface. In bright-field viewing the surface appears bright by total reflection in all areas of a platen where it is not contacted by ridges. The latter view normally requires additional components such as a lens to collimate the illumination falling on the prism surface. FIG. 1 shows an apparatus 100 adapted for bright-field viewing. A prism 102 is contacted by finger 104 (or other body member having a print pattern of ridges and valleys) on platen surface 106. Platen surface 106 can be a surface of prism 102 itself or a surface of a transparent protective film or other material optically coupled to a surface of prism 102. An illumination source 108 provides light through prism 102. Illumination source 108 may include one or more light-emitting diodes and may be located as shown, or may be located behind back prism face 110. White paint 112 may be applied to back prism face 110.

An optical axis 114 extends from prism 102 through first lens 116, aperture stop 118, and imaging lens 120 to imaging device 122. Optical elements including lenses 116 and 120 may be more complex; these lenses may be lens groups rather than single lenses and additional optical elements may be provided along axis 114 to improve image quality. The finger-contacted surface 106 is preferably viewed telecentrically by imaging device 122 so that sensitivity to ridge contact is uniform over the entire viewed area. FIG. 1 merely illustrates one way that an optical system can be configured to achieve this result. The view is made through first lens 116 that directs the collected light from the prism through aperture stop 118 into imaging lens 120 that forms an image of the contacted prism surface onto any suitable imaging device 122. Imaging device 122 may, for example, include photographic film or a digital image sensor array, such as a CCD or CMOS component. Preferably imaging device 122 is tilted at a suitable angle to achieve a sharp image of the entire finger area, as by the Scheimpflug condition.

While this design is capable of obtaining useful skin pattern images, it requires substantial illumination from LED or other light sources, which take up space in the device and require substantial electrical power. Therefore, there is a need for an improved optical illumination and imaging system and method that overcomes these deficiencies.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
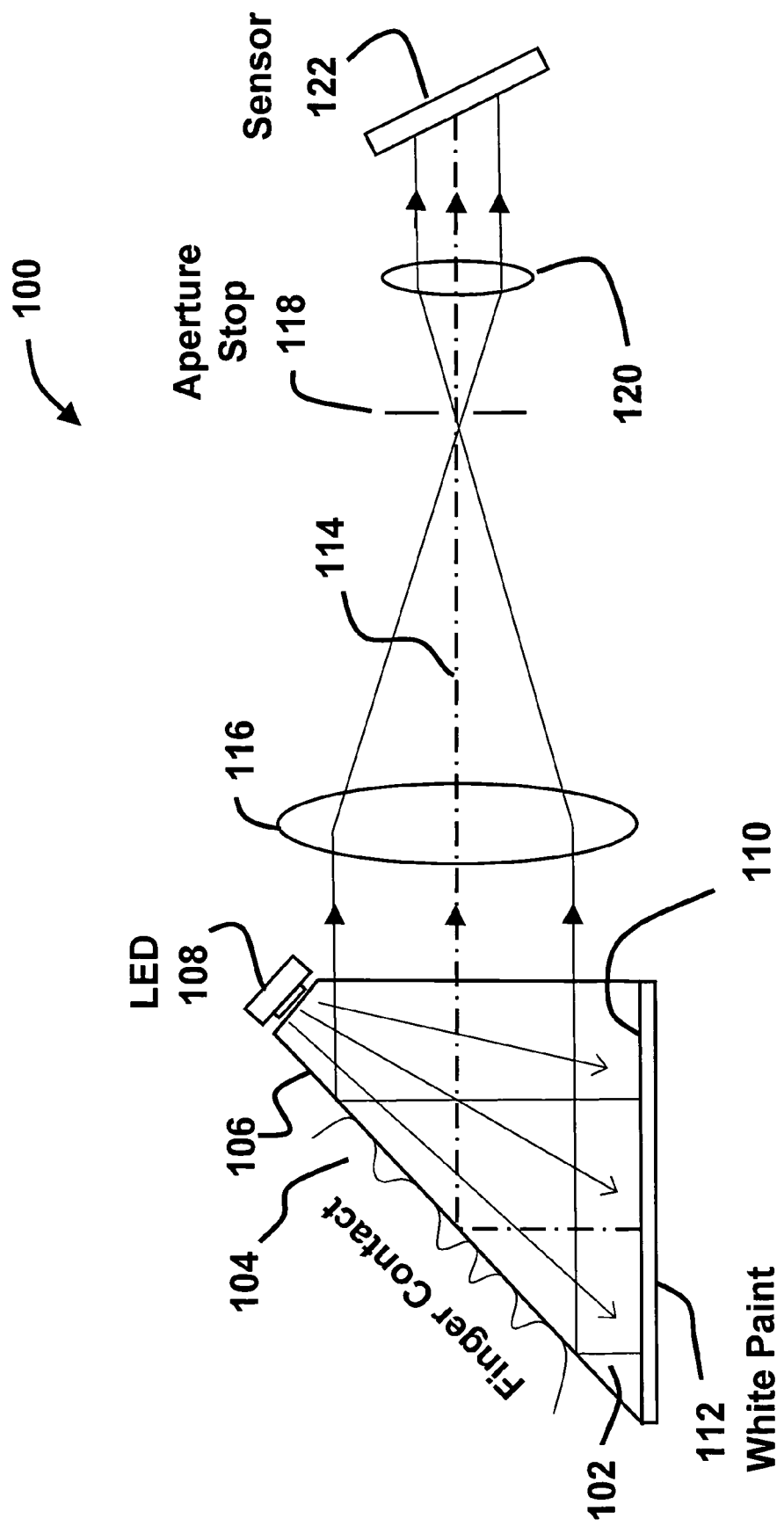
FIG. 1 is a diagram showing elements of the optical path of a fingerprint reading device, particularly including prism illumination elements.

The present invention will now be described with reference to the accompanying drawings. In the drawings, some like reference numbers indicate identical or functionally similar elements. Additionally, the left-most digit(s) of most reference numbers identify the drawing in which the reference numbers first appear.

DETAILED DESCRIPTION OF EMBODIMENTS OF THE INVENTION

The inventors have discovered that when illuminating the field of platen contact surface 106 by the method illustrated in FIG. 1, most of the light scattered from white paint 112 leaves surface 110 at angles that do not permit it to pass later through the small aperture stop 118, and that light is therefore lost from the system. A planar surface of white paint 112 is not a directionally-oriented surface. Most of the useful light is scattered from the white surface 110 through comparatively small angles, perhaps +/−25 degrees.

Figure 2A:
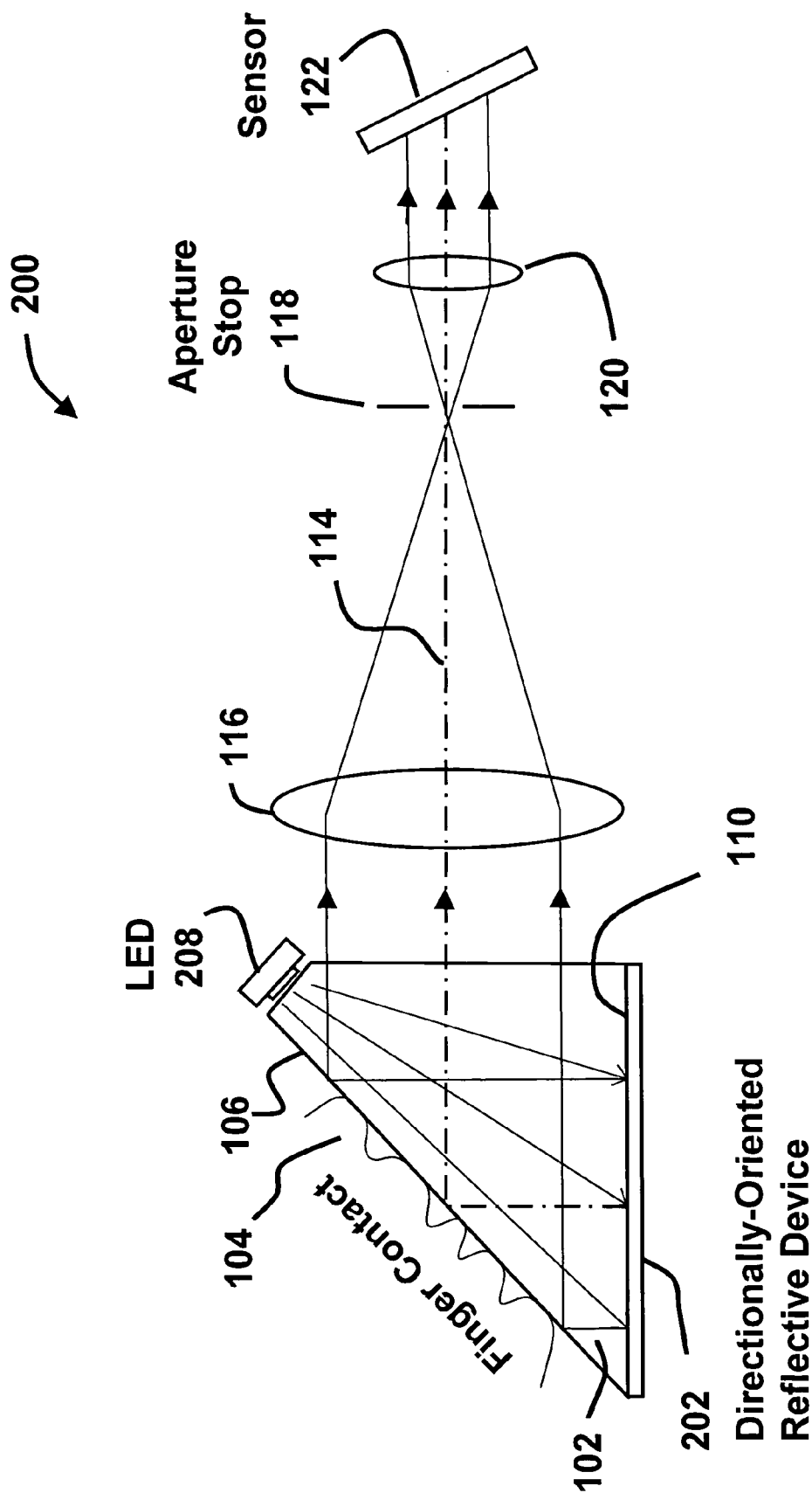
FIGS. 2A-2F are diagrams showing directionally-oriented reflective devices in the optical path of an improved fingerprint reading device with enhanced reflectivity according to embodiments of the invention.

In an embodiment of the invention, illustrated in FIG. 2A, an improved print imaging apparatus 200 provides a directionally-oriented reflective device 202 (also referred to herein as simply "element 202") at or near surface 110 of prism 102. Directionally-oriented reflective device 202 is optically coupled to surface 110. For example, directionally-oriented reflective device 202 can be integral with, adjacent to, near, or along an optical path from surface 110. An illumination source 208 provides illumination into prism 102.

Directionally-oriented reflective device 202 generally reflects internal light traveling within prism 102 toward surface 110 back within prism 102 in one or more directions leading toward the platen surface 106. Directionally-oriented reflective device 202 can reflect light back in one or more directions to more efficiently illuminate the entire surface area of platen surface 106 at desired incident angles. For instance, these direction(s) of reflection are arranged so that light reflects from directionally-oriented reflective device 202 back within prism 102 to be incident on platen surface 106 at desired angles of incidence such that a print pattern image of ridges and valleys on platen surface 106 can be viewed telecentrically with an imaging device 122. In this way, directionally-oriented reflective device 202 more efficiently directs light to platen surface 106 allowing the power of an illumination source to be reduced even in telecentric imaging systems. Optionally, directionally-oriented reflective device 202 can also scatter reflective light somewhat to provide more diffuse reflection, reduce sharp edges, and even fill across the illuminated platen surface 106.

Directionally-oriented reflective device 202 may be, for example, a slightly rough mirror surface, a nacreous pigment, common aluminum paint, or a retroreflective material such as the commercial products available from Reflexite Corp. and 3M Corp. In some cases it will be desirable to modify the design of commercially-available off-the-shelf retroreflective devices to make them somewhat less directional than conventional retroreflectors. In the case of Reflexite Corp. retroreflectors, the modification could be done by making the individual microprism facets less directional than conventional corner reflectors, and in the case of 3M SCOTCHLITE retroreflectors, the modification could be done by adjustment of the refractive indices of the glass beads.

Figure 3:
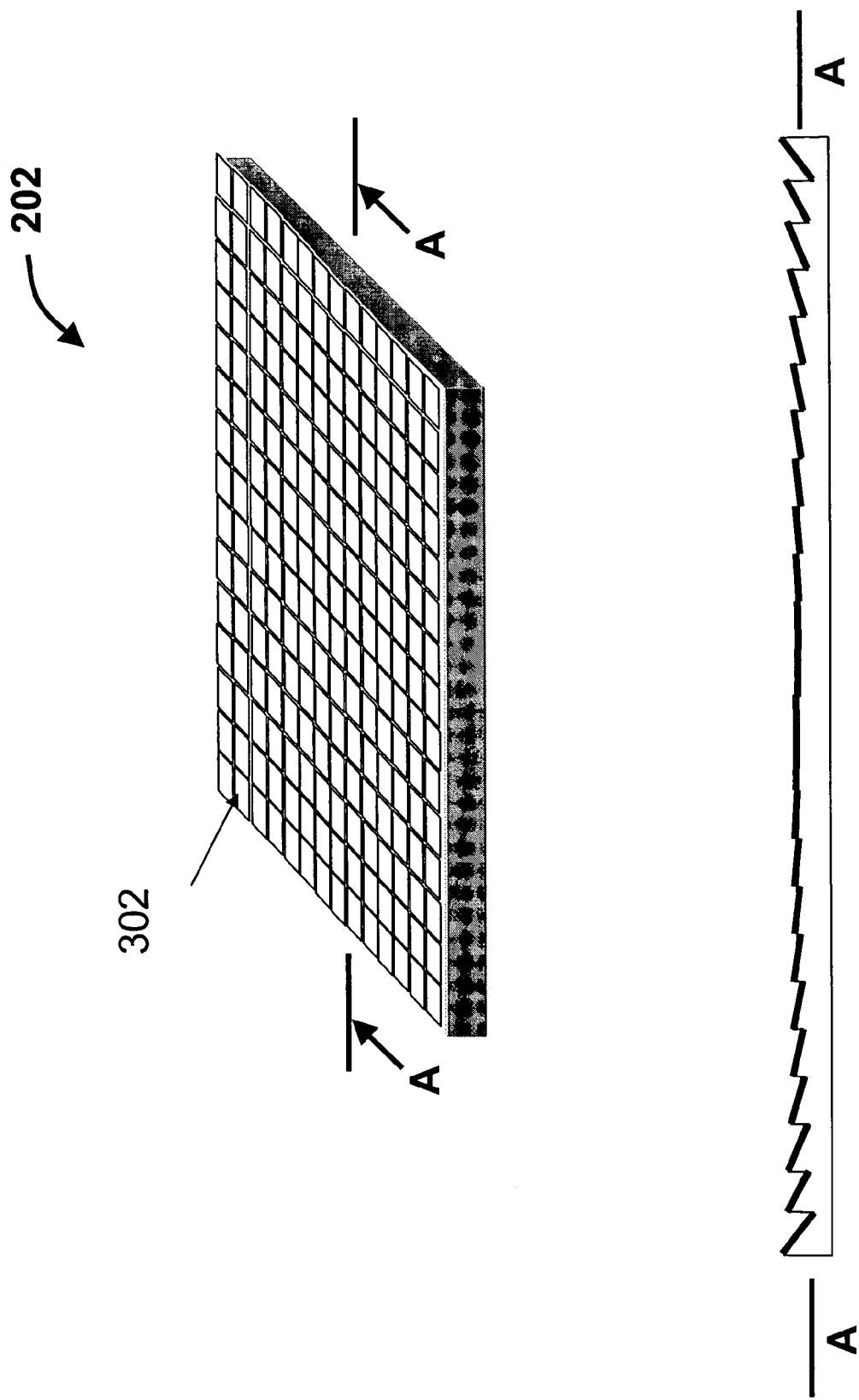
FIG. 3 is a diagram further illustrating a directionally-oriented reflective device made up of a faceted reflective surface having facets progressively tilted to form a concave mirror according to an embodiment of the invention.

In an embodiment, element 202 is an echelon reflector, or Fresnel mirror, optically coupled to prism surface 110 including but not limited to being near, adjacent to, or optionally cemented to it. Element 202 is constructed with a plurality of progressively tilted circular groove facets to function as a concave mirror. FIG. 3 shows an example of a plurality of progressively tilted groove facets 302 that function as a concave mirror. Only a small number of tilted facets are shown for clarity. A larger or smaller number of facets and different types of shapes (e.g., square, rectangular, hexagon, polygonal, or circular) can be used. Other directional arrangements can be used. The faceted reflective surface or mirror 202 can be designed to redirect light rays originating from a light-emitting diode (LED) 208 that strike anywhere on the mirror surface, so that they pass to the finger-contacted prism face 106 and reflect from it along the desired telecentric path 114, efficiently entering aperture stop 118. One or more LEDs clustered near each other can be used as illumination device 208. One advantage of embodiments of the present invention is the ability to obtain a desired level of illumination and image quality with only one or two LEDs rather than 10-12 LEDs as might be required to obtain a good image with a conventional design.

In another embodiment, element 202 is a Fresnel mirror formed as a thin plastic compression molding or injection molding and evaporatively coated with a reflective metal. In this embodiment the reflective metal may also be applied by placing a thin sheet of reflective plastic web material in the mold along with the plastic blank, pellets, or gob of material to form the molded mirror. Such a mirror can be formed with its faceted reflective surface directly facing the prism, or can be formed with its faceted reflective surface on the opposite side, so that internal reflection from the coating is used. It can be formed with an uncoated faceted positive Fresnel lens of appropriate power positioned behind the prism, and a reflective coating applied to or present as a second component behind the Fresnel lens.

In another embodiment of directionally-oriented reflective device 202, instead of a Fresnel mirror, a faceted reflective surface may be used, of the type referenced and described in U.S. Pat. No. 3,704,617 to Gold, titled "Method and Apparatus for Fabricating Imaging Means," ("a Gold-type mirror") incorporated by reference herein in its entirety.

Figure 2B:
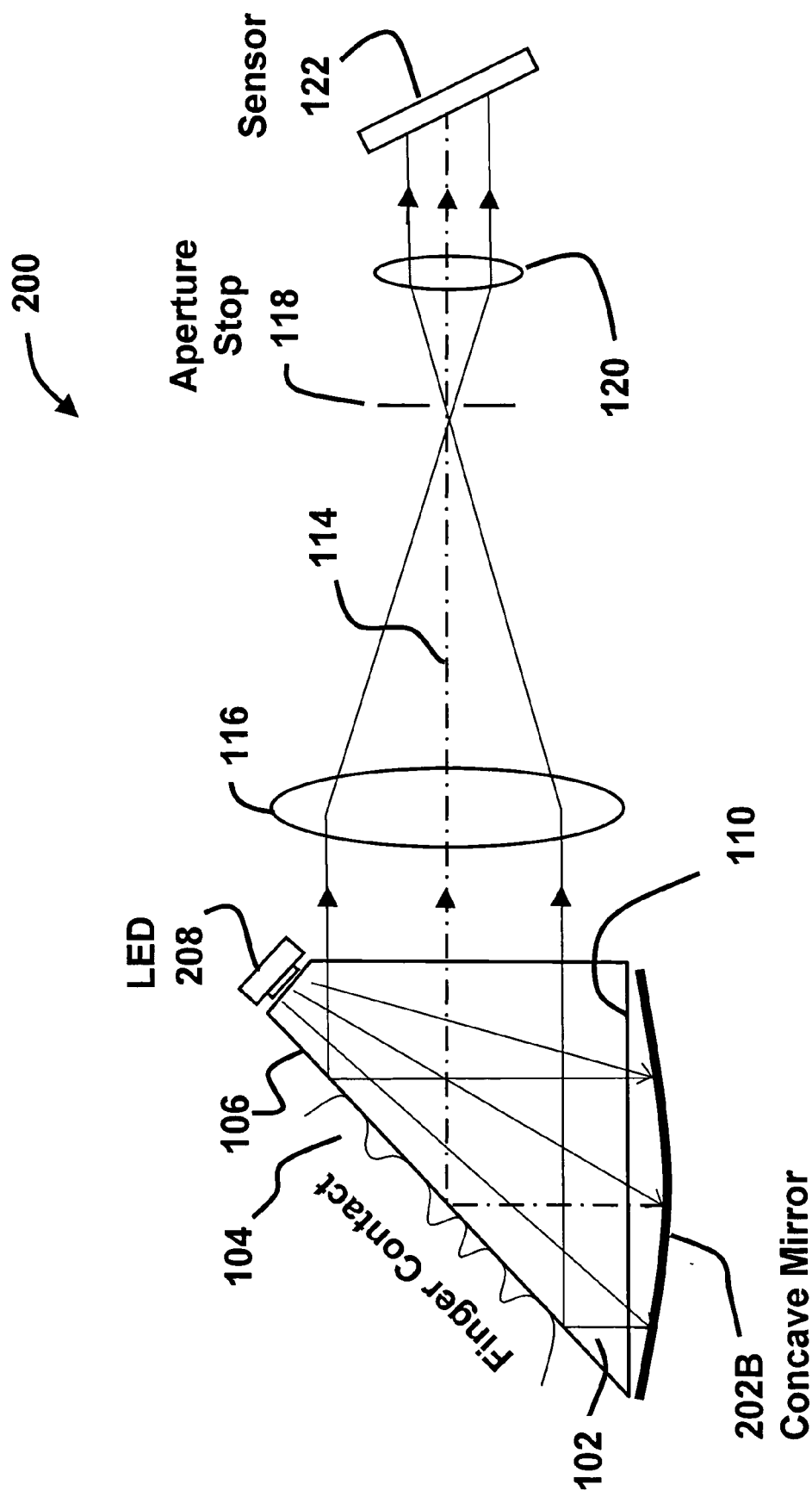
Figure 2C:
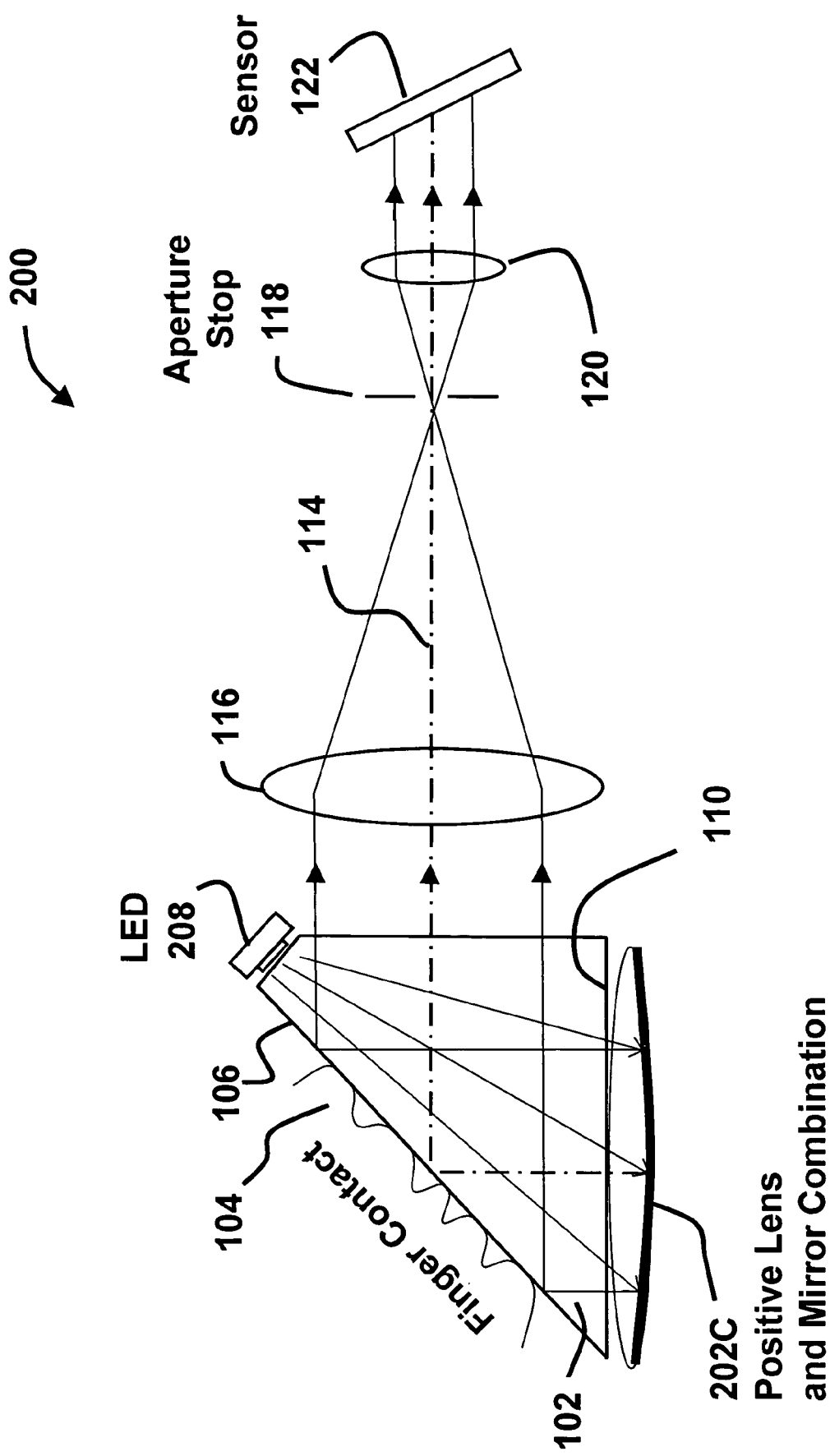
Figure 2D:
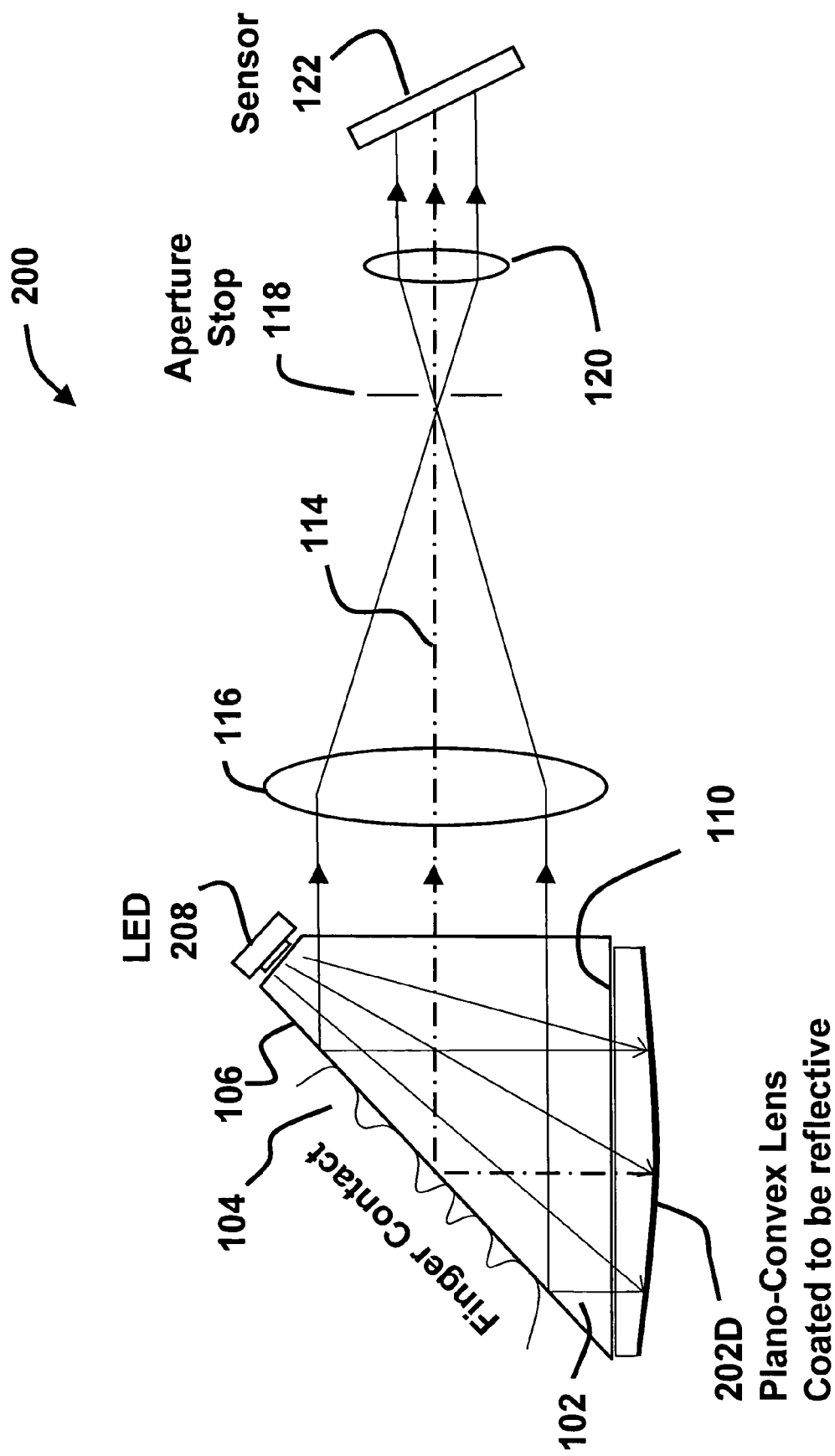
Figure 2E:
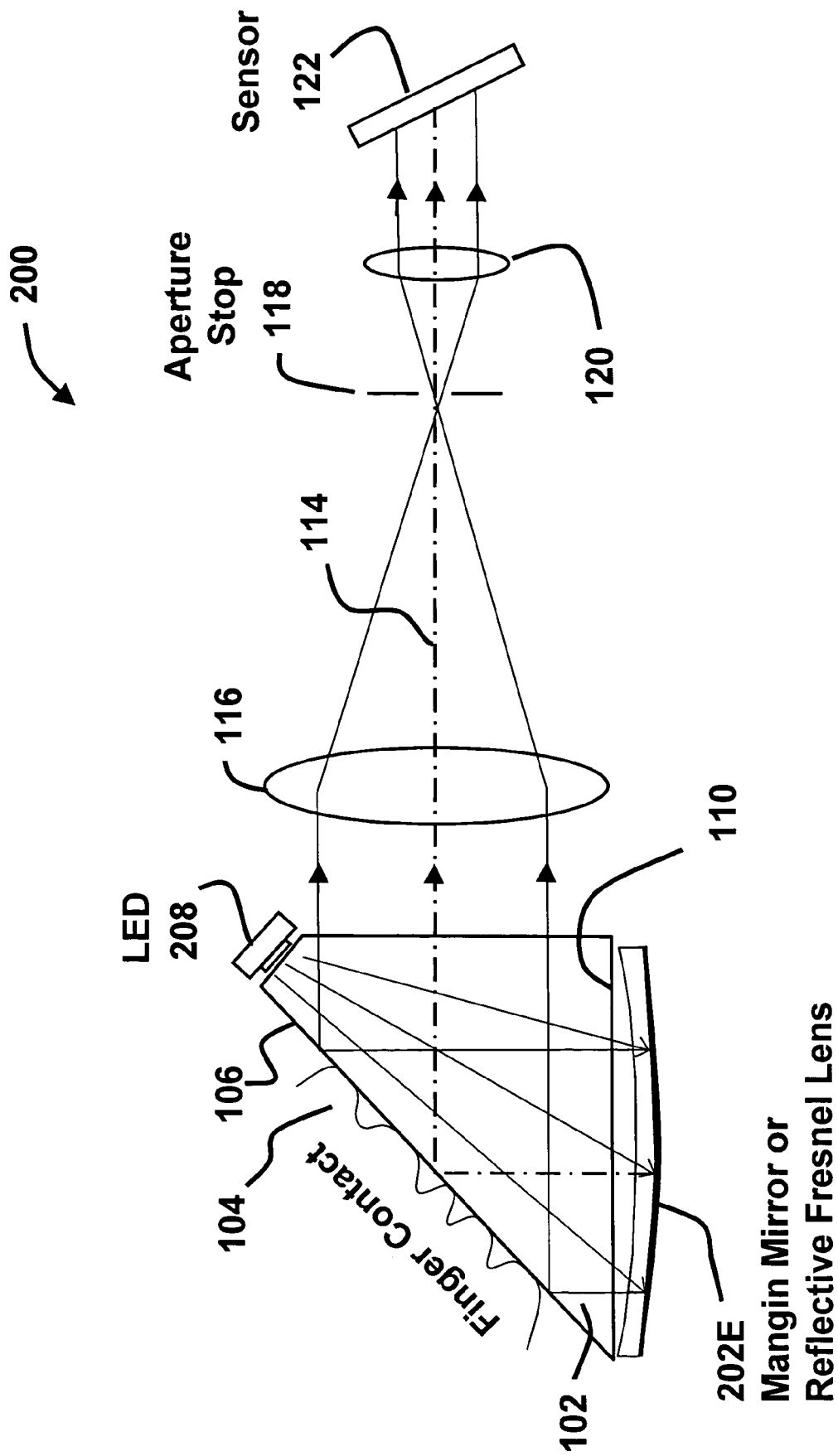

In further embodiments, other optical components are used as a directionally-oriented reflective device 202 instead of the Fresnel mirror or Gold-type mirror. Other examples of a directionally-oriented reflective device 202 according to embodiments of the invention include a spherical or aspheric concave mirror 202B in FIG. 2B, or a positive lens and mirror combination 202C in FIG. 2C, positioned to collimate the light reaching it through the back prism face and redirect it as desired. In another embodiment, a plano-convex glass or plastic lens 202D is cemented by its flat side to the back prism face 110 and coated to be reflective on its convex side (FIG. 2D). The prism 102 itself may also be formed with a generated convex optical surface on the rear facet 110 and coated to function as a concave mirror of the necessary power for reflection from within the prism. If not cemented to or integral with the prism, an attractive design option is a second-surface reflective concave mirror formed by putting a reflective surface on the convex side of a negative meniscus lens, of plastic or glass, thereby forming a Mangin mirror 202E that can easily be corrected for spherical aberration (FIG. 2E). These alternative embodiments are, in general, less preferred than the Fresnel lens or Gold-type mirror embodiments as they tend either to be larger or to be more difficult to tool and manufacture.

Figure 2F:
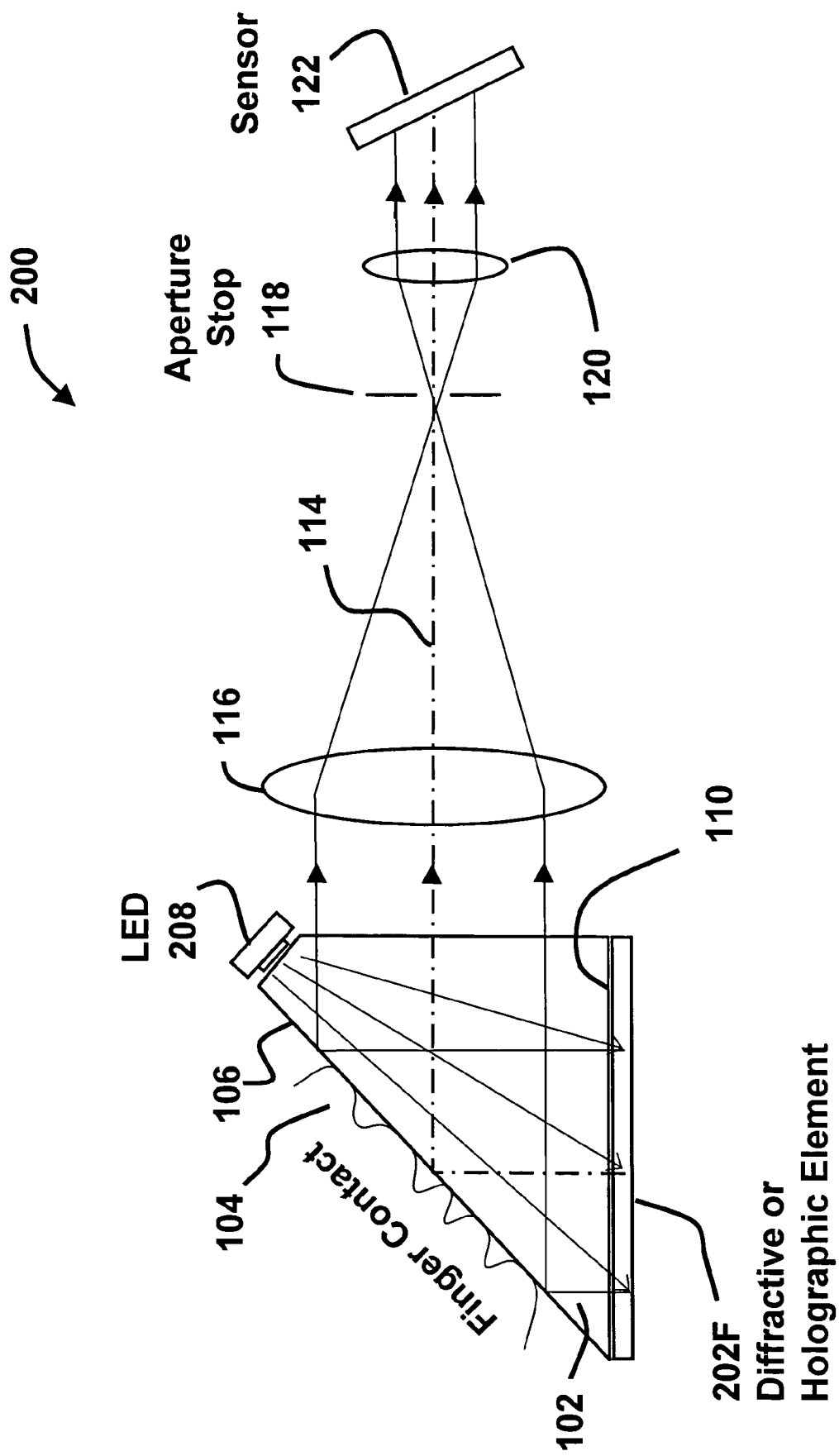

In another embodiment, directionally-oriented reflection device 202 can be a diffractive optical element 202F, including but not limited to, a diffractive grating, holographic optical element or holographic film (FIG. 2F). For instance, diffractive optical element 202F can concentrate reflected light along directions in such a way as to enhance the amount of light huffing the underside of platen surface 106 at desired angles of incidence for bright-field viewing thereby improving illumination efficiency and image contrast. See the holographic film in commonly-assigned, application Ser. No. U.S. application Ser. No. 10/462,592, filed Jun. 17, 2003, now U.S. Pat. No. 6,954,261 B2 that issued on Oct. 11, 2005, incorporated by reference herein in its entirety.

The prism surfaces through which the light first enters prism 102 and the surface adjacent to a Fresnel mirror (or other structure) do not have to be fully polished, and in fact some degree of roughness and diffusion may be beneficial, preferably a fine grind of about #220 grit. Where the light first enters the prism, such surface diffusion may help make the illumination uniform across the desired area if the source itself has some directionality, as could be a problem with a tungsten lamp. If the prism surface adjacent to the Fresnel reflector is fully polished, the light source may be sharply re-imaged onto the aperture stop of the optical system, and may appear smaller than that aperture, a condition known as partially coherent imaging. For fingerprint identification the result is generally not desirable because of excessive edge sharpening, dirt visibility, and other possible artifacts, such as Schlieren and shadowgraph enhancement of extraneous optical irregularities that are not usually seen. Those problems are greatly reduced if the adjacent prism surface is not fully polished or is coated with a suitably diffuse matte lacquer commercially available for spray-coating photographic prints. If use with a polished prism is desired, or if the Fresnel mirror is to be cemented to the prism, adequate diffusion can alternatively be introduced by applying a suitable texture to the mirror surface itself. Examples of such texture used on a Fresnel mirror are described in U.S. Pat. No. 3,718,078, "Smoothly Granulated Optical Surface and Method for Making Same," incorporated herein by reference in its entirety. In each case the desirable range of optical diffusion will assure that the image of the light source at least fills the aperture stop of the optical system, preferably with enough overlap so that the Fresnel mirror can be positioned with easy tolerances, and need not be perfectly flat, but not so much more diffusion that light is unnecessarily wasted from the system. Light loss can be compensated by using more than one adjacent LED. Optical diffusion resulting from a double transit through a fine-ground prism face should produce a satisfactory image.

Of course, the technology introduced here does not require that the optical system be fully telecentric at the finger contact surface. If it is not, then the desired function of the Fresnel mirror will be to form an image of the light source generally onto the aperture stop of the optical system wherever it may be found, and those skilled in the art will recognize that other substitutions may be made without changing the scope of this disclosure. For instance, non-telecentric imaging systems can be used with the prism illumination of the present invention.

Embodiments have been described with respect to bright-field viewing, however the present invention is not so limited. Dark-field viewing may also be used.

In the above description, prism 102 is illustrative and not intended to limit the present invention. Other types of prism shapes, including but not limited to triangular or other polygonal prisms with total internal reflection, can be used. Illumination source 208 is also illustrative and not intended to limit the present invention. Any type of illumination source including but not limited to light emitting diode(s) (LEDs), laser diode(s), tungsten lamp, or other emitter can be used. Illumination source 208 may also be arranged to inject light in other faces of prism 110 or into other optical components prior to entry into prism 110.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the patent claims and their equivalents.

What is claimed is:

1. A platen illumination system comprising:
   a prism comprising a first side, a second side, a third side and a platen side, such that the first side is between the platen side and the third side and the second side is between the platen side and the third side;
   a platen surface coupled to the platen side, the platen surface being configured to receive at least a portion of a hand;
   an illumination source optically coupled to the first side, the illumination source configured to generate a beam of radiation for illuminating the platen surface; and
   a directionally-oriented reflective device optically coupled to the second side, the directionally-oriented reflective device configured to reflect the beam of radiation towards the platen surface, wherein:
   the beam of radiation enters the prism through the first side and reflects from the directionally-oriented reflective device towards the platen surface,
   the platen surface is arranged to receive the beam of radiation at a desired angle of incidence, and
   the directionally-oriented reflective device is configured such that at least a portion of the directionally-oriented reflective device reflects the beam of radiation at a selected angle of reflection which is different than an angle of incidence of the beam of radiation on the directionally-oriented reflective device, the selected angle of reflection is such that the beam of radiation is incident upon the platen surface at the desired angle of incidence.

2. The platen illumination system of claim 1, wherein the directionally-oriented reflective device comprises a directional scattering element.

3. The platen illumination system of claim 2, wherein the directional scattering element comprises a roughened mirror surface, nacreous pigment, metallic paint, or retroreflective material.

4. The platen illumination system of claim 1, wherein the directionally-oriented reflective device comprises an echelon reflector.

5. The platen illumination system of claim 1, wherein the directionally-oriented reflective device comprises a Fresnel mirror.

6. The platen illumination system of claim 1, wherein the directionally-oriented reflective device includes a plurality of progressively tilted facets.

7. The platen illumination system of claim 6, wherein the plurality of progressively tilted facets comprise circular groove facets that collectively function as a concave mirror.

8. The platen illumination system of claim 1, wherein the directionally-oriented reflective device reflects the beam of radiation at the selected angle of reflection such that the beam of radiation further reflects from the platen surface along a telecentric path out of the prism.

9. The platen illumination system of claim 1, wherein the directionally-oriented reflective device comprises a multifaceted reflective surface.

10. The platen illumination system of claim 1, wherein the directionally-oriented reflective device comprises a Fresnel lens between the prism and a reflective element.

11. The platen illumination system of claim 1, wherein the directionally-oriented reflective device comprises a combination of optical elements.

12. The platen illumination system of claim 11, wherein the combination of optical elements includes a combination of refractive and reflective surfaces.

13. The platen illumination system of claim 11, wherein the combination of optical elements comprises a Mangin mirror.

14. The platen illumination system of claim 1, wherein the directionally-oriented reflective device comprises a concave mirror.

15. The platen illumination system of claim 1, wherein the directionally-oriented reflective device comprises a diffractive optical element.

16. The platen illumination system of claim 15, wherein the diffractive optical element comprises a holographic film.

17. The platen illumination system of claim 9, wherein the multifaceted reflective surface comprises a plurality of progressively tilted facets.

18. The platen illumination system of claim 17, wherein the plurality of progressively tilted facets comprises circular groove facets that collectively function as a concave mirror.

19. The platen illumination system of claim 1, wherein the directionally-oriented reflective device is configured to concentrate or focus the beam of radiation onto the platen surface.

20. The platen illumination system of claim 1, wherein the directionally-oriented reflective device reflects a plurality of beams of radiation toward the platen surface at a plurality of selected angles of reflection, wherein the plurality of beams of radiation are incident upon the platen surface at a plurality of respective desired angles of incidence with respect to the platen surface.

21. The platen illumination system of claim 20, wherein the plurality of desired angles of incidence are selected such that a print pattern received on the platen surface can be viewed telecentrically with an imaging device.

22. The platen illumination system of claim 20, wherein the plurality of desired angles of incidence are selected, such that a print pattern received on the platen surface can be illuminated with at most two light emitting diodes (LEDs).

23. The platen illumination system of claim 1, wherein the platen surface comprises a surface of the platen side of the prism.

24. The platen illumination system of claim 1, wherein the platen surface comprises a platen element optically coupled to a surface of the platen side of the prism.

25. The platen illumination system of claim 1, wherein the selected angle of reflection results in a reduction of scattering of the beam of radiation.

26. The platen illumination system of claim 15, wherein the diffractive optical element includes a holographic optical element.

27. A system for imaging at least a portion of a hand, comprising:
- a prism comprising a first side, a second side, a third side and a platen side, such that the first side is between the platen side and the third side and the second side is between the platen side and the third side;
- a platen surface coupled to the platen side, the platen surface being configured to receive at least a portion of a hand;
- an illumination source optically coupled to the first side, the illumination source configured to generate a beam of radiation for illuminating the platen surface;
- a directionally-oriented reflective device optically coupled to the second side, the directionally-oriented reflective device configured to reflect the beam of radiation towards the platen surface;
- an imaging device configured to view the platen surface telecentrically; and
- an aperture stop between the imaging device and the platen surface, the aperture stop configured to transmit at least a portion of the beam of radiation from the platen surface along a telecentric path before imaging of the at least a portion of the beam of radiation by the imaging device, wherein:
  - the beam of radiation enters the prism through the first side and reflects from the directionally-oriented reflective device towards the platen surface,
  - the platen surface is arranged to receive the beam of radiation at a desired angle of incidence, and
  - the directionally-oriented reflective device is configured such that at least a portion of the directionally-oriented reflective device reflects the beam of radiation at a selected angle of reflection which is different than an angle of incidence of the beam of radiation on the directionally-oriented reflective device, wherein:
    - the selected angle of reflection is such that the beam of radiation is incident upon the platen surface at the desired angle of incidence, and
    - the desired angle of incidence is arranged to result in reflection of the beam of radiation from the platen surface along the telecentric path to the aperture, wherein an intensity of the at least a portion of the beam of radiation transmitted by the aperture and collected by the imaging device is maximized.

* * * * *